(12) United States Patent
Collins et al.

(10) Patent No.: US 9,153,065 B2
(45) Date of Patent: Oct. 6, 2015

(54) SYSTEM AND METHOD FOR ADJUSTING IMAGE PIXEL COLOR TO CREATE A PARALLAX DEPTH EFFECT

(71) Applicant: Google Technology Holdings LLC, Mountain View, CA (US)

(72) Inventors: Brian M Collins, South San Franciso, CA (US); Allen Khorasani, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 279 days.

(21) Appl. No.: 13/759,666

(22) Filed: Feb. 5, 2013

(65) Prior Publication Data

US 2014/0218364 A1    Aug. 7, 2014

(51) Int. Cl.
  *G06T 15/50* (2011.01)
  *G06T 15/04* (2011.01)
  *G06T 15/60* (2006.01)

(52) U.S. Cl.
  CPC ............. *G06T 15/04* (2013.01); *G06T 15/50* (2013.01); *G06T 15/60* (2013.01)

(58) Field of Classification Search
  None
  See application file for complete search history.

(56) References Cited

U.S. PATENT DOCUMENTS

| | | | |
|---|---|---|---|
| 7,136,069 B1 * | 11/2006 | Dawson | ........................ 345/582 |
| 7,924,281 B2 | 4/2011 | Morein et al. | |
| 2002/0080136 A1 | 6/2002 | Kouadio et al. | |

OTHER PUBLICATIONS

Tuck "Gestalt Principles Applied in Design" posted online on Aug. 17, 2010 @ http://sixrevisions.com/web_design/gestalt-principles-applied-in-design.*
Fabien "Bumpmapping with GLSL", available online @ http://www.fabiensanglard.net/bumpMapping/index.php since Mar. 19, 2009.*
Tatarchuk, Practical Dynamic Parallax Occlusion Mapping, Siggraph 2005, (available at http://developer.amd.com/media/gpu_assets/Tatarchuk-ParallaxOcclusionMapping-Sketch-print.pdf).
Xichun Jennifer Guo, Phong Shading and Gouraud Shading, Cornell University Study, MEng. project 1996.

* cited by examiner

*Primary Examiner* — Yingchun He

(57) ABSTRACT

A method carried out by a graphics processing apparatus samples a texture value of a first texture layer at an offset to a second texture layer of a surface and adjusts pixel color for a pixel of the second texture layer using the texture value such that an appearance of depth is created between the first texture layer and the second texture layer. The method may adjust the pixel color using the sampled texture value alpha component. Another method includes transforming a surface normal vector to eye space for a surface having at least first and second texture layers mapped thereto, determining an offset between the first texture layer and the second texture layer using the transformed surface normal vector, sampling a texture value of the first texture layer using the offset, and adjusting pixel color for a pixel of the second texture layer using the texture value.

20 Claims, 5 Drawing Sheets

- PRIOR ART -

- PRIOR ART -

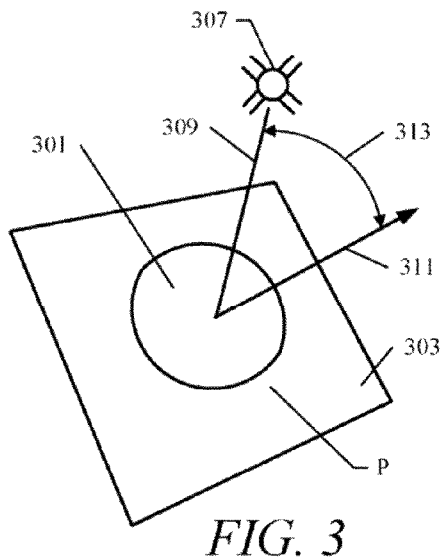
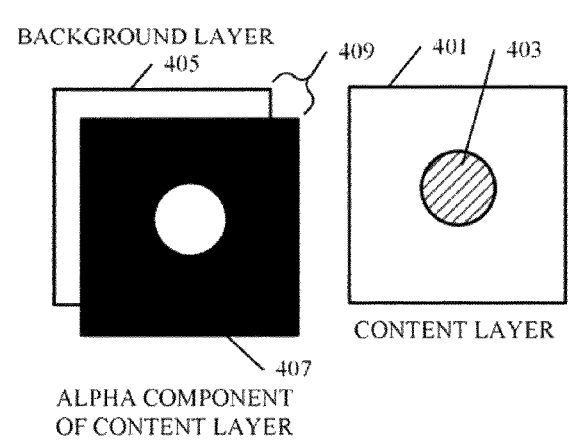
FIG. 3
FIG. 4
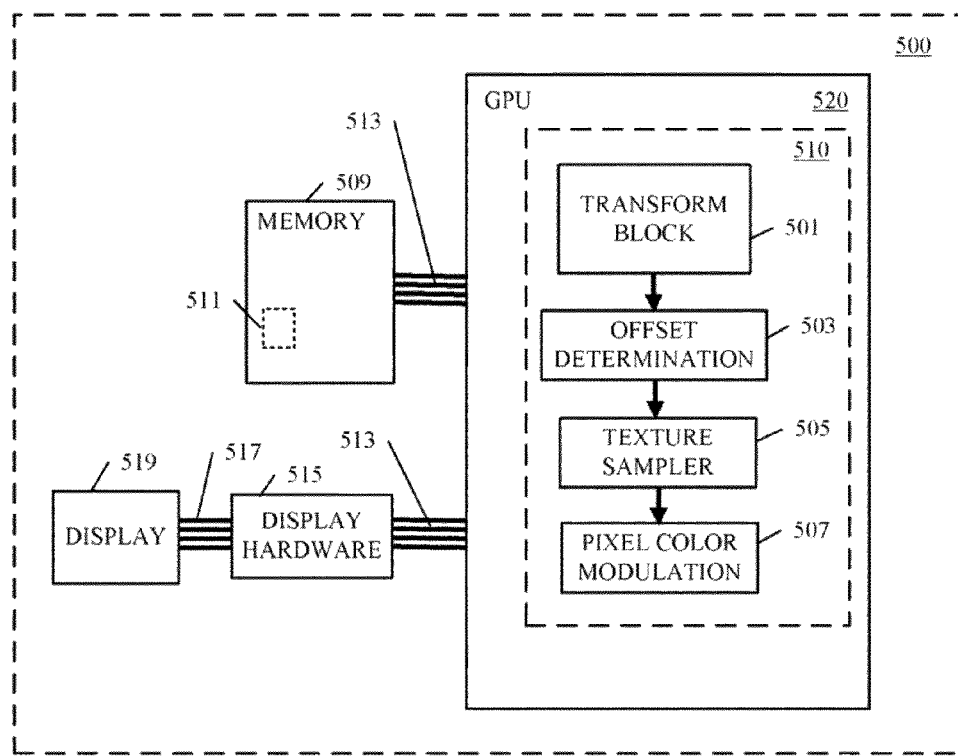
FIG. 5

SYSTEM AND METHOD FOR ADJUSTING IMAGE PIXEL COLOR TO CREATE A PARALLAX DEPTH EFFECT

FIELD OF THE DISCLOSURE

The present disclosure relates generally to graphics processing and image rendering and more particularly to a system and method for determining the color of a pixel within an image.

BACKGROUND

Mobile computing devices such as laptops, mobile phones, and other devices having a display include graphics processing systems that draw various objects via a graphics pipeline. The process of the graphics pipeline that produces the objects for display is known as rendering. For purposes of rending an object, the object is composed of "primitives" which are more simple shapes such as triangles or other suitable polygons. The primitives are generated via groups of pixels where each pixel may include a color, texture, opacity and luminance characteristic. In order to create images that appear three dimensional (3D) on the display, various 3D attributes may be computed by the graphics pipeline such as light absorption, refraction and reflection by the various objects and their respective surfaces.

These characteristics are then applied to pixels corresponding to the regions on an image, composed of one or more objects, so that the image is realistic looking and appears to be a 3D image. In cases where lighting is applied to the pixels of an object, the amount of lighting is determined based on the position of a light source. FIG. 1 provides an example of how lighting may be applied to an object having a surface 103. For a given pixel "P", an angle is determined between the rays emanating from a light source 101 to the pixel P. This ray is represented by the vector "L". The vector "R" represents a ray in the direction of the specular reflection from the surface 103 at pixel P and at an angle of 2θ from the light vector L. That is, the angle of incidence occurs at an angle θ to a vector "n" which is normal to the surface 103 at pixel P. The angle of incidence is equal to the angle of reflection and therefore R is likewise at an angle θ to the normal vector n. The eye space or camera space may be defined by a line of sight vector "S" which is defined as a ray with respect to a hypothetical eye 105 and by an angle α to the reflected ray vector R. That is, the vector S defines the specular reflection with respect to a viewer's line of sight position. Specular reflection refers to light perfectly reflected, as by a mirror, from the light source 101 to the viewer, i.e. the hypothetical eye 105.

Specular reflection becomes visible when the surface normal vector n is oriented halfway between the light vector L and line of sight vector S. That is, the so-called "half-angle" direction or "half vector" is a surface normal vector bisecting the angle formed by a light vector of incidence and a reflected ray pointing in the line of sight of the viewer. If the hypothetical eye 105 were positioned at the reflected ray R (i.e. if R was at the line of sight) then the viewer would observe the specular reflection of light source 101, because the normal vector bisects the angle 2θ. As the angle α increases, the magnitude of the specular reflection will change or the specular reflection may no longer be visible. For modeling purposes, the remaining reflective portions are defined as reflections from microfacets of the surface 103, where each microfacet has its respective normal vector. These microfacets may refer to the primitives, i.e. the triangles or polygons that make up the object to be rendered. The consideration of distribution of the normal vectors on microfacets is determined by the reflection model utilized such as the Phong reflection model (also known as Phong lighting). That is, FIG. 1 illustrates that for a given surface, the direction of light and the reflection model (or lighting model) applied will determine the visibility and appearance of specular highlights.

Shadowing techniques may also be applied to objects of an image. An example is shown in FIG. 2, where an object 203 intersects a light source 201 to project a shadow 207 onto a background 205. A shadowing technique known as shadow buffering or shadow mapping computes the distance from the light source to the closest object for each light ray, and manages the computed distances using z-buffering techniques, also referred to as depth buffering. When treating an object from the point of view of the light source, the computed depth values are referred to as a shadow buffer or shadow map. In order to render the image, the shadow buffering technique checks for object intersections by computing the distance from the light source at a point of interest and comparing it to the depth values stored in the shadow buffer that are close to the ray emanating from the point of interest to the light source. If the distance from the light source to the point of interest is greater than the shadow buffer depth value then the nearby ray is shadowed, because it is assumed to intersect an object that is closer to the light source than the point of interest.

The shadow buffering technique has the drawback of requiring depth buffering. Although other shadowing techniques exist such as projected textures, stencil shadow volumes, etc., these other shadowing techniques also have drawbacks because they require buffering or require additional textures and the associated graphics processing computations.

BRIEF DESCRIPTION OF THE DRAWINGS

FIG. 3 illustrates a method of computing an offset in accordance with an embodiment.

FIG. 4 provides further details of a method making use of the alpha component in accordance with an embodiment.

FIG. 5 is a partial schematic block diagram of an example of a graphics processing apparatus that performs the pixel color determination method according to one embodiment.

DETAILED DESCRIPTION

Figure 1:
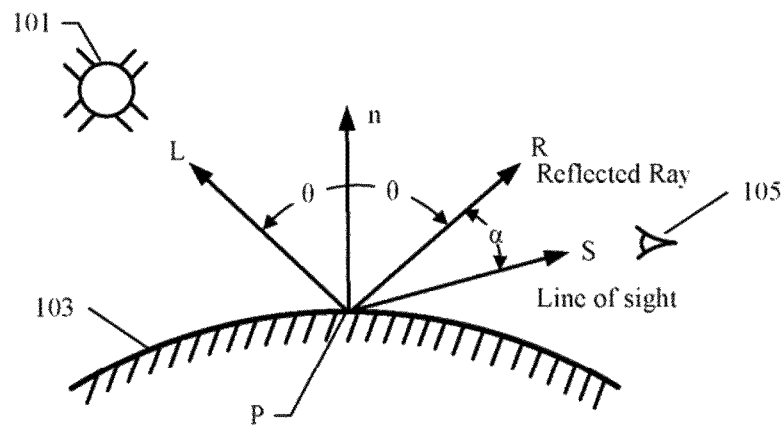
FIG. 1 is a side view illustrating a known approach for modeling lighting for a pixel of interest on the surface of an object in an image.
Figure 2:
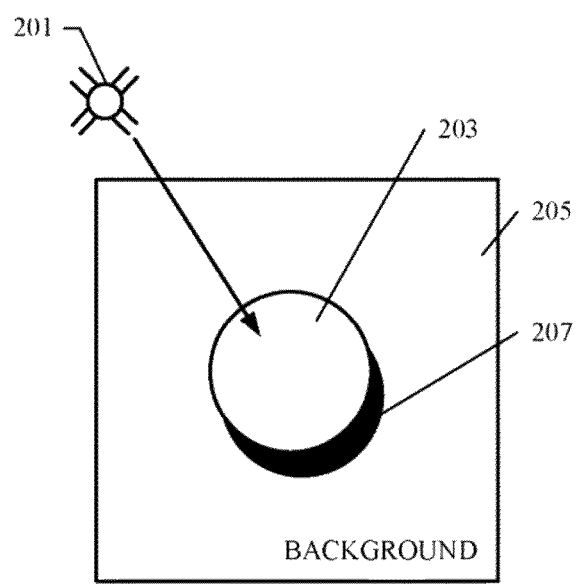
FIG. 2 illustrates the result of applying a known shadowing technique so that an object in an image projects a shadow onto a background, based on the position of a light source.

A graphics processing apparatus and method adds parallax depth to a flat two-dimensional (2D) surface in an image to be displayed on a display. One example application provides a shadow effect between two texture layers mapped to a surface. According to one disclosed method, a 2D surface is lit by shifting texture coordinates based on the surface normal directions transformed into eye space (also referred to as camera space) and modifying the background color based on the texture values that are fetched. Based on the type of movements, the half vector to the eye may be modified instead of the normal vector, such that camera motion can create a parallax effect. In an example provided herein, the method is applied to the surface normal vector such that the orientation of the surface creates the parallax effect.

The above mentioned application of the embodiments that creates a shadow effect may make use of the specular component of the Phong lighting model. However, it is to be understood that lighting is not required in the disclosed method and that therefore, the offset can be calculated based on any motion using the surface normal or the half vector. The disclosed method requires transforming the surface normal or obtaining the half vector to the camera, however, unlike other shadow techniques such as shadow maps, projected textures, or stencil shadow volumes, the disclosed method requires no additional geometry or textures and no additional rendering passes. That is, without the disclosed method, to create the same effect would require creation of additional geometry to be rendered as a map in to a texture to be applied to the surface.

One disclosed method carried out by a graphics processing apparatus includes sampling a texture value of a first texture layer at an offset to a second texture layer of a surface that has at least the first texture layer and the second texture layer mapped thereto. The method adjusts pixel color for a pixel of the second texture layer using the sampled texture value such that an appearance of depth is created between the first texture layer and the second texture layer. The method may include sampling only the pixel color alpha component and adjusting the pixel color for a pixel of the second texture layer using the sampled alpha component value. The offset is determined as a two-dimensional coordinate offset in texture space. The method concludes with rendering a content having the surface such that the appearance of depth is created between the first texture layer and the second texture layer using a single rendering pass of a graphics pipeline. The appearance of depth may be achieved in one example via a shadow effect between the first texture layer and the second texture layer.

Another disclosed method carried out by a graphics processing apparatus involves transforming a surface normal vector to eye space for a surface having at least first and second texture layers mapped thereto, determining an offset between the first texture layer and the second texture layer using the transformed surface normal vector, sampling a texture value of the first texture layer using the offset, and adjusting pixel color for a pixel of the second texture layer using the sample texture value.

A disclosed graphics processing apparatus operative to perform the above methods includes texture sampler logic, operative to sample a texture value of a first texture layer at an offset to a second texture layer of a surface having at least the first texture layer and the second texture layer mapped thereto, and pixel color modulation logic, operatively coupled to the texture sampler logic. The pixel color modulation logic is operative to adjust pixel color for a pixel of the second texture layer using the sample texture value such that an appearance of depth is created between the first texture layer and the second texture layer.

Turning to the drawings, FIG. 3 and FIG. 4 illustrate determination of an offset between two texture layers of content in an image to be rendered. The content may be an object having two or more texture layers or may refer only to the texture layers. The content may have a surface that has various texture layers mapped to it to create the final appearance within an image. As illustrated by FIG. 1, for a given surface, the direction of light and the reflection model (or lighting model) applied will determine the visibility and appearance of specular highlights. In an example application of the embodiments, an offset is determined by transforming a surface normal vector 311 that is normal to a content of interest 301. In the example of FIG. 3, the content of interest 301 is rendered along with a background 303. To create a shadow effect, the method and apparatus adjusts the color of one or more pixels of interest such as pixel of interest "P." Initially, the surface normal 311 is transformed into eye space using the light vector 309 which points toward the light source 307. The magnitude of a shadow offset 313 may be determined by calculating the dot product of the surface normal vector 311 and the light vector 309.

FIG. 4 illustrates application of the offset. The offset is applied to determine a coordinate in 2D texture space, i.e. "UV space," so that a texture value may be sampled at that coordinate. That is, any texture mapping applied to the content of interest 301 surface will also impact the reflectivity and therefore the appearance of specular highlights. As is known, UV mapping is utilized to handle 3D imagery in graphics processing systems. In the process of "UV mapping" a 2D image representation of a 3D model is generated where "U" and "V" represent the 2D texture axes. The process of "texture mapping" maps some function onto a surface in 3D. The function domain may be one, two or three dimensional and may be represented as an array or a mathematical function. Therefore, even the specular reflection may be applied using texture mapping. The texture space is defined by the UV space which is mapped to object space (i.e. x, y and z coordinate space) which is finally mapped to a screen space (x and y) to render and produce the displayed image.

For creating a shadow effect in accordance with the embodiments, the appropriate UV coordinates are calculated inside a texture that is mapped to the surface in order to sample the texture at a correct offset to mask the specular highlight. That is, by using the x and y coordinate of the surface normal vector n and the light vector from a light source, a vector transformed into eye space (also referred to as camera space) represents the appropriate direction of the light source as the object rotates.

As illustrated in FIG. 3, a shadow offset in texture space (i.e. UV coordinate space) may be determined by initially calculating a dot product. The light direction vector is transformed into eye space as 1 minus the dot product of the surface normal vector and the light direction vector. The scalar value may then be used to multiply the x and y components of the light direction vector to obtain a set of coordinates. That is, the x and y components of the light vector are multiplied by the scalar value of $[1-(\vec{n}\cdot\vec{L})]$ to obtain a coordinate in UV texture space.

The operation may be thought of as being applied to different texture layers as shown in FIG. 4. A "content layer" 401 includes some content of interest 403 and may have an alpha component 407 as shown. The offset 409 may be determined with respect to, for example, a background layer 405 and the content layer 401, or alternatively, only the alpha component 407 of the content layer 401. That is, the rendered image may be considered to consist of the content layer 401 having the content of interest 403 and the alpha component 407, and the background layer 405. The offset 409 is determined between the content layer 401 and the background layer 405. Put another way, the offset 409 may be considered to be an offset between two different textures of a surface, where the background layer 405 and the content layer 401 are textures that are both mapped to the same surface to create a final image color.

Each of the texture layers consists of pixels with given RGBA (red green blue alpha) color space values. The final pixel color for any pixel in the image is determined using compositing operations on the layers. That is, the final pixel color of the pixel of interest "P", is determined as the sum of the background color and the content color, where the content color is multiplied by 1 minus the content alpha component.

This can be expressed in mathematical terms by using the following abbreviations and symbolic parameters to facilitate description of the pixel color determination:

$C_{Backround}$: color of a background pixel;
$C_{BT}$: color of a background texture;
$C_{Content}$: color of a content pixel;
$C_{CT}$: color of a content texture;
$i_s$: specular component (which may be determined by an applicable lighting model);
$i_d$: diffuse component (also determined by the applicable lighting model);
α: alpha component of a pixel of the content layer in an RGBA color space;
$α_{offset}$: the alpha component of the content layer at the coordinate determined using the offset.

Given the above definitions, the color of the pixel of interest P is determined by, for example:

$$C_{Pixel}=C_{Backround}+C_{Content}(1-α);$$

where $$C_{Backround}=[C_{BT}+(α_{offset}i_s)]α_{offset}i_d, \text{ and where}$$

$$C_{Content}=(C_{CT}+i_s)i_d.$$

The shifting offset may be calculated as a function of the size of a font or of texture elements in texel space, for example where one unit in texel space is 1/width and 1/height of the texture. Once the texture value is fetched using the offset, it can be used to perform any mathematical operation with the "background" color such as add, subtract, modulate, etc., to create a "ghost" or "shadow" effect. In one example, the value may be used to modulate or "mask" the specular highlights resulting from Phong lighting equations. Because the masking is done on the specular highlights this makes the parallax shadow dynamic and it reacts to the light direction.

Figure 9:
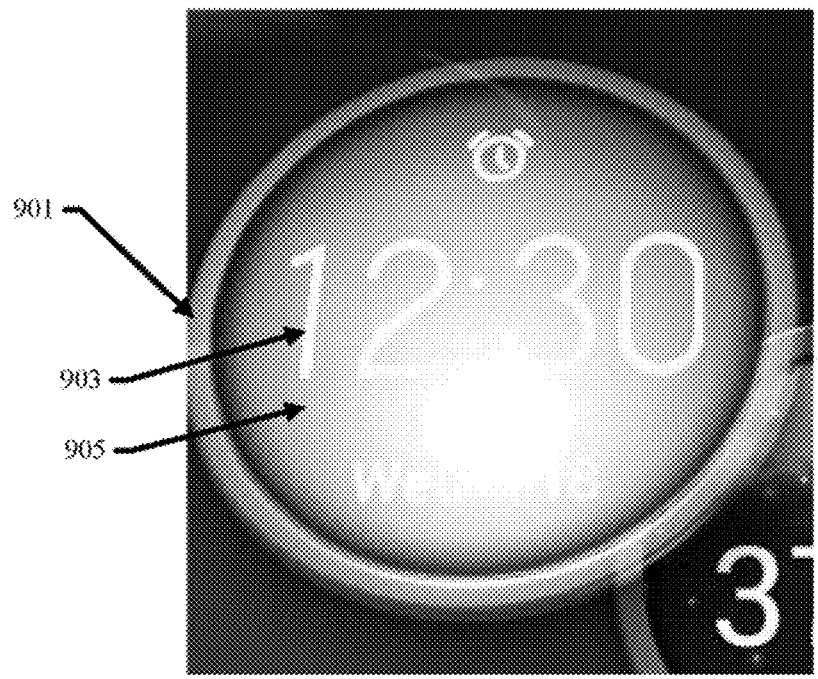
FIG. 9 is a "before" screen shot of an image having content with multiple texture layers, prior to using the method of the disclosed example embodiments.
Figure 10:
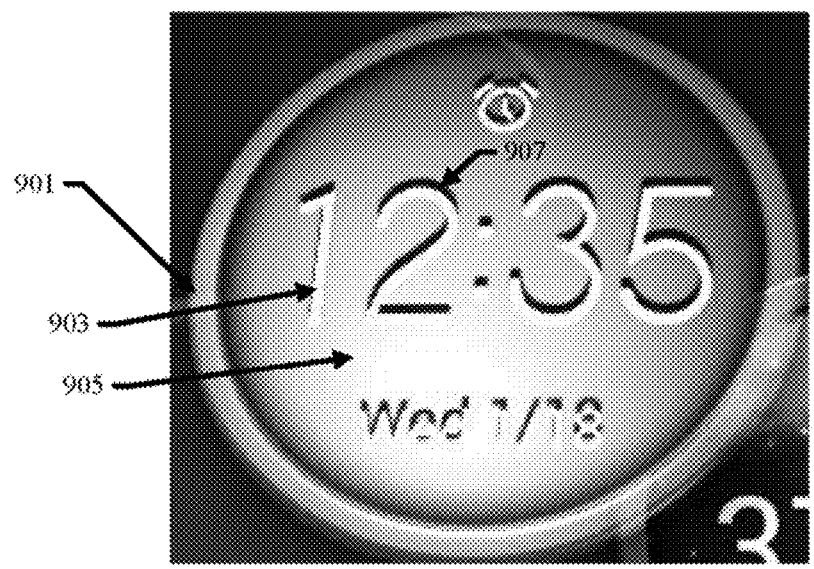
FIG. 10 is an "after" screen shot of an image having content similar to FIG. 9 with the method of one embodiment being performed by a graphics processing apparatus similar to the example graphics processing apparatus illustrated in FIG. 5.

Once the texture is sampled at the offset location and the RGBA values are obtained for a pixel of interest, the alpha component or the translucency channel is used to modulate the calculated specular high light as illustrated in the above equations. Use of the alpha component provides for a "soft shadow" or parallax effect if the original texture has soft edges at no additional cost of computation. An example of the appearance obtained is shown by "before and after" screen shots in FIG. 9 and FIG. 10, respectively. The clock widget 901 is "content" that has a first texture layer 903, which include the fonts used to display day, date and time and a clock icon, and a second texture layer 905 which serves as a "background layer" which in this example appears as a greyish metallic texture. The surface normal to the first texture layer, i.e. the fonts, etc., is transformed to eye space, and the background layer texture is sampled for various pixels of interest (i.e. the areas about the fonts given the offset). The alpha component adjustment masks the specular highlights and results in the shadow effect 907 as shown, which gives the font of the first texture layer 903 the appearance of floating above the background texture layer 905. Other applications of the method will become apparent to those of ordinary skill in light of the example, drawings and disclosure provided herein. For example, lighting is not required in the application of the method. Various applications to create a parallax depth appearance between texture layers are contemplated by the disclosed embodiments.

It is to be understood that "RGBA" as used herein refers to the color space information (i.e. red, green, blue, and alpha) and not to any specific color space information format and is therefore not to be construed as a limiting term. That is, various formats for storing the RGBA color space information may be used for implementing the various disclosed embodiments. For example, ARGB format, ARGB32 format, A8R8G8B8 format, BGRA format, or any other suitable format may be used in accordance with the embodiments.

A graphics processing apparatus in one example embodiment is a graphics processing unit (GPU) 520 that is operative to perform the above described method and that is illustrated in FIG. 5. The GPU 520 may be contained with another apparatus 500 such as an electronic device. The electronic device may be, but is not limited to, a mobile phone, laptop computer, electronic book reader, PDA, etc., that includes a display 519 and that is operative to perform the methods of operation herein described. The display 519 is operatively coupled via connection lines 517 to display hardware 515, such as drivers etc., and that is further operatively coupled, via connection lines 513, to the GPU 520. The connection lines 513 may be implemented as an internal communication bus for sending and receiving commands and data between the various components. The graphics processing apparatus may be implemented using one or more logic components where "logic" as used herein may include software and/or firmware executing on one or more programmable processors (including CPUs and/or GPUs), and may also include ASICs, DSPs, hardwired circuitry (logic circuitry), or combinations thereof. For the example embodiment illustrated by FIG. 5, the GPU 520 includes a graphics pipeline that may be implemented wholly or in part as executable instructions stored in memory 509, or some other memory, that is a non-volatile, non-transitory memory.

It is to be understood that while FIG. 5 provides an example for the purpose of describing to those of ordinary skill how to make and use the various embodiments, FIG. 5 is limited to showing only those components necessary to describe the features and advantages of the various embodiments to those of ordinary skill. It is to be understood that various other components, circuitry, and devices may be necessary in order to implement a complete functional apparatus (such as a mobile communication device) or the graphics processing apparatus and that those various other components, circuitry, devices, etc., are understood to be present by those of ordinary skill.

A memory 509 is operatively coupled to the GPU 520 and contains texture information 511 such as the RGBA values for various pixels or various texture layers. The RGBA color space values, i.e. the texture information 511, may be in any suitable format for storing and accessing RGBA color space values as mentioned above. These RGBA values may be fetched by the GPU 520 by pointing to the appropriate index corresponding to the stored values. In some embodiments, only one color component such as the alpha component value of the RGBA color value need be fetched. For example, in the application creating a shadow effect, only the alpha component is needed. The texture values may be stored as the texture information 511 in memory 509, or may alternatively be stored in a texture memory located on the GPU 520 in some embodiments. Put another way, texture sampling is the process of fetching a texture value, such as an RGBA value (or one of the RGBA component values) of a pixel of the texture (also referred to as a "texel"), for a texture layer at a given position.

The GPU 520 includes a graphics pipeline 510 that may further consist of various shaders. Some of the shaders may be implemented as circuitry or may be implemented as executable instructions stored in memory 509 or other memory and loaded to, or executed by, the GPU 520 therefrom. In accordance with the embodiments, the graphics pipeline includes transform block 501, which is transform logic that is operative to transform a surface normal vector into eye space. Offset determination logic 503 is operatively coupled to the transform block 501, and determines the offset value at which to sample a texture layer. Texture sampler logic 505 is operatively coupled to the offset determination logic and receives the offset value. The texture sampler logic 505 fetches a texture layer texture value from texture information 511 via pointing to the index of the desired texture value stored in memory 509 (or stored in a GPU 520 on-chip texture memory) within the texture information 511. Pixel color modulation logic 507 is operatively coupled to the texture sampler logic 505 and receives the fetched texture sample. The pixel color modulation logic 507 adjusts (i.e. modulates) the pixel color of the pixel of interest to create the parallax depth effect. In the example provided above, the alpha component of a pixel value may be used to adjust the pixel color to mask a specular feature and create a shadow effect. The pixel color modulation logic 507 may be implemented as a pixel shader.

Figure 6:
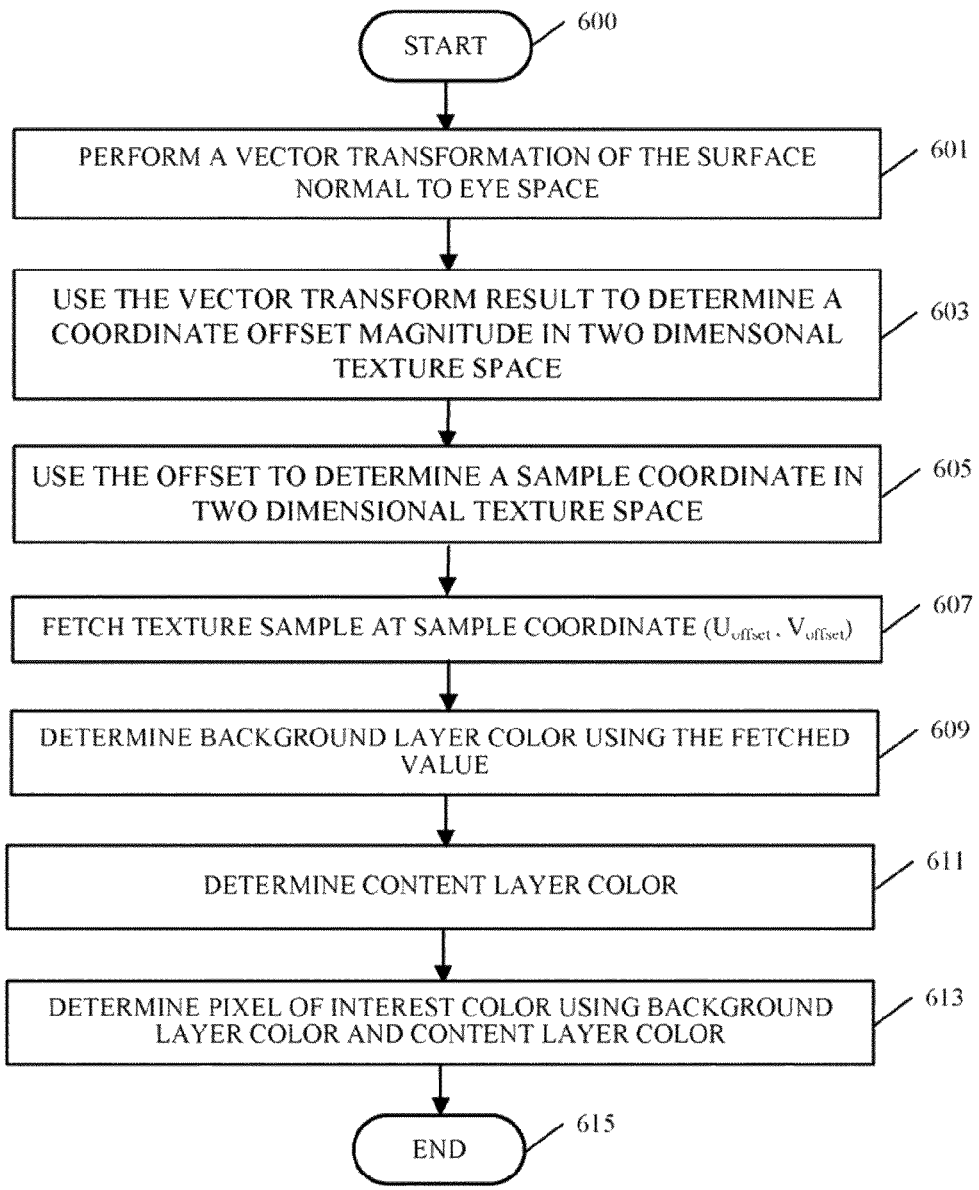
FIG. 6 is a flow chart illustrating the operations performed by the graphics processing apparatus when performing the pixel color determination method in accordance with one example embodiment.

One method of operation of the graphics processing apparatus of FIG. 5 is illustrated by the flowchart of FIG. 6. The method of operation begins in block 600 as shown. In 601 the transform block 501 performs a vector transformation of the surface normal vector to eye space. In block 603, the offset determination logic 503 uses the vector transformation result to determine a coordinate offset magnitude in two-dimensional texture space. For example, the coordinate offset magnitude may be applied to the UV texture coordinate space to obtain a UV coordinate at which to fetch a texture sample. In block 605, the texture sampler logic 505 determines an appropriate sample coordinate in texture space, and in 607, fetches the texture sample at the sample coordinate from the texture information 511 in memory 509. The pixel color modulation logic 507 obtains the fetched texture sample value and determines the background layer color using the fetched value as shown in 609. In 611, the pixel color modulation logic 507 determines the content layer color and in block 613 determines the pixel of interest color using the background layer color and content layer color. The method of operation ends in 615 as shown.

Figure 7:
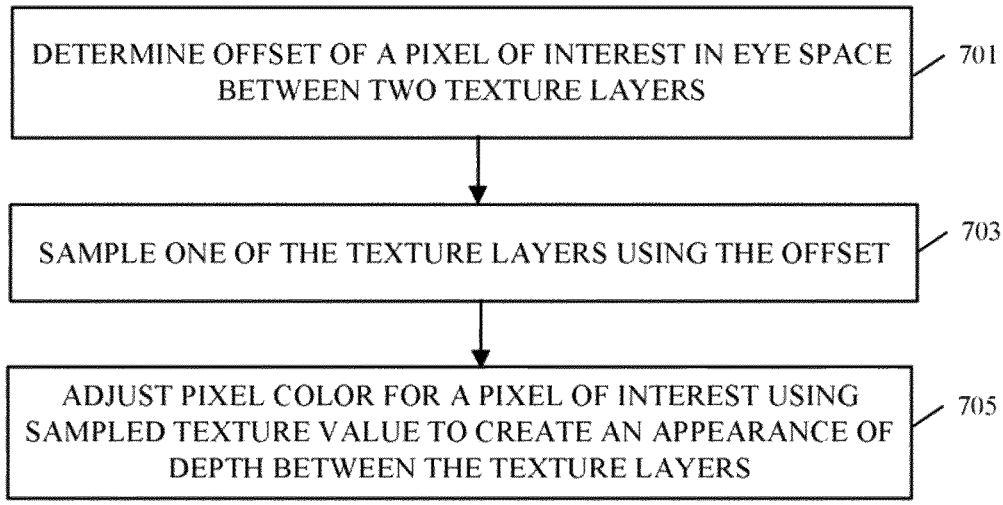
FIG. 7 is a flow chart illustrating the operations performed by the graphics processing apparatus when performing the pixel color determination method in accordance with one example embodiment.

The flowchart of FIG. 7 illustrates that the graphics pipeline 510 determines an offset of the pixel of interest in eye space between two texture layers as shown in 701. In 703, one of the texture layers is sampled using the offset. As shown in 705, pixel color for a pixel of interest is adjusted using the sample texture value to create an appearance of depth between the texture layers.

Figure 8:
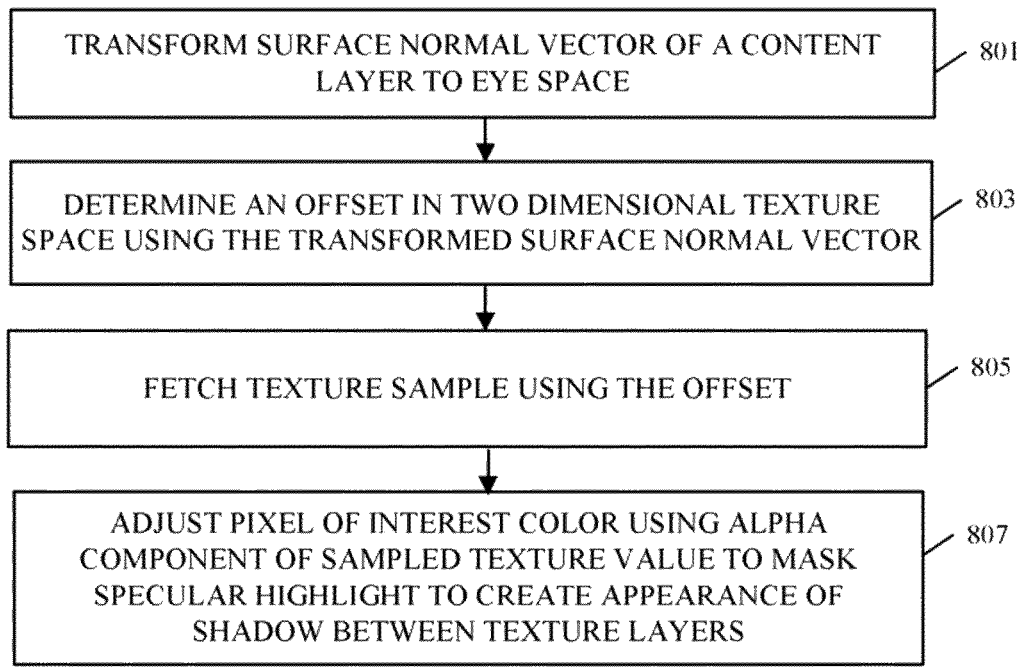
FIG. 8 is a flow chart illustrating the operations performed by the graphics processing apparatus when performing the pixel color determination method in accordance with one example embodiment.

The flowchart of FIG. 8 relates to the example of creating a shadow effect between texture layers. Thus in 801, the surface normal vector of a content layer is transformed to eye space. As shown in 803 an offset in two-dimensional texture space is determined using the transformed surface normal vector and in 805, a texture sample is fetched using the offset. In 807, to create the appearance of a shadow effect between the texture layers, the alpha component of the sampled texture value is used to adjust the color of the pixel of interest and thereby mask the specular highlight.

In some embodiments, the methods of operation are implemented on a GPU in one render pass utilizing the graphics libraries such as the OpenGL® ES 2.0 shader pipeline. This is accomplished by transforming the surface normal by the 3×3 upper portion of the Inverse transpose of the OpenGL® "ModelView" Matrix. The x and y portions of the surface normal provides the "shifted" UV's to sample already existing textures on the object. Other GPU APIs may be used and the embodiments are not limited by any particular shader pipeline or GPU API.

Thus methods and apparatuses for creating the appearance of parallax depth between texture layers mapped to a surface have been disclosed. In one example application, the specular component of a lighting model (such as Phong lighting) may be masked at appropriate locations to create the appearance of a shadow effect between texture layers as shown in the before and after images of FIG. 9 and FIG. 10. Various other applications for the embodiments will occur to those of ordinary skill given the examples and description provided herein, and such applications are contemplated by the various disclosed embodiments.

That is, while various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method of a graphics processing apparatus comprising:
   sampling a texture value of a first texture layer at an offset to a second texture layer of a surface having at least the first texture layer and the second texture layer mapped thereto;
   adjusting pixel color for a pixel of the second texture layer using the texture value; and
   determining a background pixel color as a sum of a background texture color and a specular component, the specular component multiplied by an alpha component at a coordinate determined by the offset, and the sum multiplied by a product of a diffuse component and the alpha component at the coordinate determined by the offset.

2. The method of claim 1, wherein sampling a texture value of a first texture layer at an offset to a second texture layer comprises:
   sampling the alpha component of the first texture layer at the offset, where the alpha component is the texture value, and adjusting the pixel color for a pixel of the second texture layer using the alpha component.

3. The method of claim 2, wherein sampling the texture value of the first texture layer at the offset to the second texture layer comprises:

determining the offset as a two-dimensional coordinate offset.

4. The method of claim 3, further comprising:
transforming a surface normal vector to eye space for the surface; and
determining the offset between the first texture layer and the second texture layer using the transformed surface normal vector.

5. The method of claim 3, further comprising:
rendering a content comprising the surface such that an appearance of depth is created between the first texture layer and the second texture layer using a single rendering pass of a graphics pipeline, the appearance of depth achieved via a shadow effect between the first texture layer and the second texture layer.

6. The method of claim 1, wherein the adjusting the pixel color includes adjusting the pixel color for the pixel of the second texture using the texture value and the determined background pixel color.

7. A method of a graphics processing apparatus comprising:
transforming a surface normal vector to eye space for a surface having at least first and second texture layers mapped thereto;
determining an offset between the first texture layer and the second texture layer using the transformed surface normal vector;
sampling a texture value of the first texture layer using the offset;
adjusting pixel color for a pixel of the second texture layer using the texture value; and
determining a background pixel as a sum of background texture color and a specular component, the specular component multiplied by an alpha component at a coordinate determined by the offset, and the sum multiplied by a product of a diffuse component and the alpha component at the coordinate determined by the offset.

8. The method of claim 7, wherein transforming the surface normal vector comprises:
calculating a dot product result of a surface normal of a primitive and a light direction vector;
determining an x-coordinate offset as the product of the dot product result and an x-component magnitude of the light direction vector; and
determining a y-coordinate offset as the product of the dot product result and a y component magnitude of the light direction vector.

9. The method of claim 7, further comprising:
determining a content pixel color as a sum of a content texture color and the specular component, the sum multiplied by the diffuse component.

10. The method of claim 9, further comprising:
determining a final color as a sum of the background pixel color and the content pixel color, the content pixel color multiplied by the value of one minus a content pixel color alpha component value.

11. A graphics processing apparatus comprising:
a processing unit; and
memory comprising executable instructions stored thereon that, when executed by the processing unit, are configured to cause the graphics processing apparatus to implement at least:
texture sampler logic, operative to sample a texture value of a first texture layer at an offset to a second texture layer of a surface having at least the first texture layer and the second texture layer mapped thereto;
pixel color modulation logic, operatively coupled to the texture sampler logic, the pixel color modulation logic operative to adjust pixel color for a pixel of the first texture layer using the texture value; and
background pixel color logic, operative to determine a background color as a sum of a background texture color and a specular component, the specular component multiplied by an alpha component at a coordinate determined by the offset, and the sum multiplied by a product of a diffuse component and the alpha component at the coordinate determined by the offset.

12. The graphics processing apparatus of claim 11, wherein the texture sampler logic is further operative to sample the alpha component of the first texture layer at the offset, where the alpha component is the texture value, and where the pixel color modulation logic is further operative to adjust the pixel color for a pixel of the second texture layer using the alpha component.

13. The graphics processing apparatus of claim 11, wherein the instructions stored on the memory are further configured to cause the graphics processing apparatus to implement:
offset determination logic, operatively coupled to the texture sampler logic, the offset determination logic operative to determine the offset as a two-dimensional coordinate offset.

14. The graphics processing apparatus of claim 13, wherein the instructions stored on the memory are further configured to cause the graphics processing apparatus to implement:
transform logic, operatively coupled to the offset determination logic, the transform logic operative to transform a surface normal vector to eye space for the surface; and
the offset determination logic further operative to determine the offset between the first texture layer and the second texture layer using the transformed surface normal vector.

15. The graphics processing apparatus of claim 11, wherein the pixel color modulation logic is operative to adjust the pixel color for the pixel of the first texture layer using the texture value and the determined background color.

16. The graphics processing apparatus of claim 11, wherein the instructions are further configured to cause the graphics processing apparatus to implement:
rendering logic, operative to render a content comprising the surface such that an appearance of depth is created between the first texture layer and the second texture layer using a single rendering pass of a graphics pipeline, the appearance of depth achieved via a shadow effect between the first texture layer and the second texture layer.

17. A graphics processing apparatus comprising:
a processing unit; and
memory comprising executable instructions stored thereon that, when executed by the processing unit, are configured to cause the graphics processing apparatus to implement at least:
transform logic, operative to transform a surface normal vector to eye space for a surface having at least first and second texture layers mapped thereto;
offset determination logic, operatively coupled to the transform logic, operative to determine an offset between the first texture layer and the second texture layer using the transformed surface normal vector;
texture sampler logic, operatively coupled to the offset determination logic, operative to sample a texture value of the first texture layer using the offset; and pixel color modulation logic, operatively coupled to the texture sampler logic, operative to:
adjust pixel color for a pixel of the second texture layer using the texture value; and
determining a background pixel color as a sum of background texture color and a specular component, the specular component multiplied by an alpha component at a coordinate determined by the offset, and the sum multiplied by a product of a diffuse component and the alpha component at the coordinate determined by the offset.

18. The graphics processing apparatus of claim 17, wherein the transform logic is further operative to:
calculate a dot product result of a surface normal of a primitive and a light direction vector;
determine an x-coordinate offset as the product of the dot product result and an x-component magnitude of the light direction vector; and
determine a y-coordinate offset as the product of the dot product result and a y-component magnitude of the light direction vector.

19. The graphics processing apparatus of claim 17, wherein the pixel color modulation logic is further operative to:
determine a content pixel color as the sum of a content texture color and the specular component, the sum multiplied by the diffuse component; and
determine a final color as a sum of the background pixel color and the content pixel color, the content pixel color multiplied by a value of one minus a content pixel color alpha component value.

20. A mobile communication device comprising the graphics processing apparatus of claim 17 and a display operatively coupled to the graphics processing apparatus.

* * * * *

UNITED STATES PATENT AND TRADEMARK OFFICE
CERTIFICATE OF CORRECTION

| | | |
|---|---|---|
| PATENT NO. | : 9,153,065 B2 | Page 1 of 1 |
| APPLICATION NO. | : 13/759666 | |
| DATED | : October 6, 2015 | |
| INVENTOR(S) | : Collins et al. | |

It is certified that error appears in the above-identified patent and that said Letters Patent is hereby corrected as shown below:

On the title page item (72), "Inventors", line 1, delete "South San Franciso," and insert
-- South San Francisco, --, therefor.

In the claims

Column 9, line 46, claim 8, delete "y component" and insert -- y-component --, therefor.

Column 11, line 5, claim 17, delete "determining" and insert -- determine --, therefor.

Signed and Sealed this
First Day of March, 2016

Michelle K. Lee
*Director of the United States Patent and Trademark Office*